UNITED STATES PATENT OFFICE.

ELIZABETH E. MEFFORD AND SUSAN PEEBLES, OF ADRIAN, MICHIGAN.

IMPROVEMENT IN PROCESSES OF PRESERVING FRUIT.

Specification forming part of Letters Patent No. 176,754, dated May 2, 1876; application filed March 24, 1876.

*To all whom it may concern:*

Be it known that we, ELIZABETH E. MEFFORD and SUSAN PEEBLES, of Adrian, in the county of Lenawee and State of Michigan, have invented certain new and useful Improvements in the Process of Preserving Fruit, of which the following is a specification:

This invention relates to an improved process of treating fruit—such as apples, peaches, and the like—for the preservation of the same, its object being to dry the fruits more thoroughly and quickly than by the ordinary process hitherto practiced, and at the same time to prevent the oxidation of the outer or exposed portions of the fruit, which causes the disagreeable brown or "dried-apple" appearance and taste to the fruit.

The invention consists in subjecting the fruit, after it has been properly prepared and cut for drying in the ordinary manner, to the action of sulphurous acid for a suitable length of time, to combine or unite with the outer portions of the fruit and prevent the usual oxidizing effect of the atmosphere upon the same. The fruit, after being subjected to the action of the sulphurous acid, may be dried by simple exposure to the atmosphere, or by any of the improved processes in use for artificially drying the fruit.

In carrying out our invention the fruit is pared and cored or pitted in the usual manner, and exposed, in a suitable chamber, vessel, or room, to the action of the sulphurous acid—preferably in the form of gas, although it may be applied in solution in water. The gas is preferably generated by burning a sulphur match of suitable size, formed by dipping cloth or other textile material in melted sulphur. The amount of time required for the exposure of the fruit to the action of the acid will vary somewhat, according to the nature and character of the fruit and the state of the atmosphere at the time of the operation, an exposure of from five to fifteen minutes being generally sufficient; but more or less time may be given under peculiar circumstances. The fruit, after remaining the proper length of time, is removed from the treating case or chamber, and thoroughly dried by simply exposing it to the action of the sun and atmosphere, or by means of any of the artificial methods commonly employed for the purpose.

As thus treated the oxidizing effects of the atmosphere are effectually prevented, the dried fruit having a light and agreeable appearance and the taste of the fresh fruit, the brown or "dried-apple" appearance or taste being entirely done away with. The acid also acts beneficially in other respects, materially shortening the time required for drying, as it tends to attract the moisture and juices to the surface of the fruit, from which they are more readily removed when subjected to the drying action, and also arrests all tendency to decomposition, preventing the souring of the fruit during the process of drying.

The fruit thus prepared, when stewed or cooked, presents the appearance of freshly-cut fruit when similarly stewed or cooked, with all the delicacy of flavor of the fresh fruit.

The drying of the fruit after treatment with the sulphurous acid gas dispels all taste of sulphur.

We are aware that sulphurous acid has heretofore been used for preserving animal substances, and also for bleaching grain; and this we do not claim.

What we claim, and desire to secure by Letters Patent, is—

The process herein described of preserving fruit by first subjecting it to the action of sulphurous acid and afterward drying it, substantially as and for the purposes specified.

In testimony that we claim the foregoing we have hereunto set our hands in the presence of the subscribing witnesses.

ELIZABETH E. MEFFORD.
   SUSAN PEEBLES.

Witnesses:
 F. L. MEFFORD,
 R. B. ROBBINS.